June 26, 1923.
E. J. MALONE
1,460,105
SWING JOINT
Filed March 7, 1921
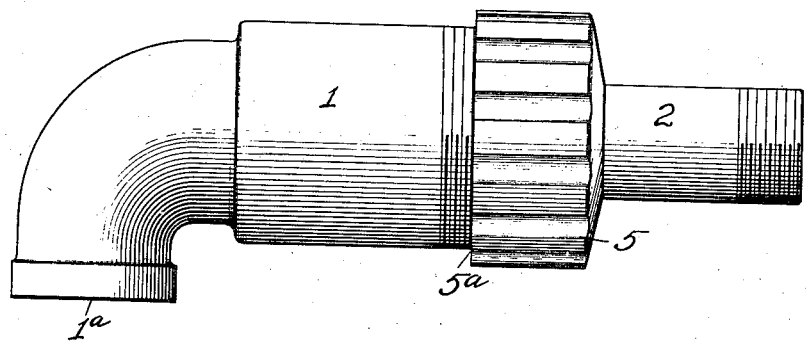
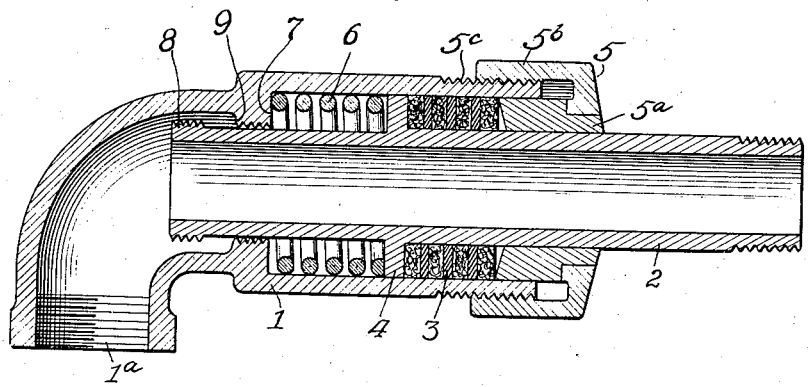
Witness:
R. Burkhardt
Inventor:
Ernest J. Malone,
By Wilkinson, Huxley, Byron & Knight,
Attys.

Patented June 26, 1923.

1,460,105

UNITED STATES PATENT OFFICE.

ERNEST J. MALONE, OF CHICAGO, ILLINOIS, ASSIGNOR TO TROY LAUNDRY MACHINERY CO. LTD., OF CHICAGO, ILLINOIS, A CORPORATION OF NEW YORK.

SWING JOINT.

Application filed March 7, 1921. Serial No. 450,311.

*To all whom it may concern:*

Be it known that I, ERNEST J. MALONE, a citizen of Canada, residing at Chicago, in the county of Cook and State of Illinois, have invented certain new and useful Improvements in Swing Joints, of which the following is a specification.

This invention relates to packed telescoping and hinging pipe joints of the type in which a surrounding shoulder on the inner end of the inner pipe member axially overlaps an internal shoulder of the outer pipe member in a manner to resist unintentional separation of the pipe members under internal pressure.

Heretofore, in order to permit assembly and disassembly of the pipe members of such a joint, it has been necessary to make one or the other of the shoulders separable from the member that carried it; or else the outer pipe member has been made in sections that permitted it to be dissected and the inner pipe member to be introduced from the inner end outward. These methods have involved complication in construction and consequent expense, as well as unreliability and lack of durability in the joint.

One object of the present invention is to provide a simple, efficient, and reliable construction of packed telescopic and rotary pipe joint, having means for resisting the axial blow out of the inner member from the outer member in case the packing is released; one in which the parts can be assembled by introducing the inner member longitudinally through the outer end of the surrounding member without dissecting the surrounding member or displacing either of the axially overlapping shoulders; and one in which the safety interlock is unavoidably incident to the act of assembly and cannot be omitted by oversight. Accordingly, one feature of the invention consists in providing the inner and outer telescoping members, at points lying axially inward from their packing, with overlapping enlargements that are integral with the respective members and provided with means, such as screw threads, which permit them to pass each other in axial assembly and disassembly of the pipe members without impairing the effectiveness of the shoulders which the enlargements provide.

It has also been proposed, in joints of the kind above described, to provide springs for resiliently sustaining the inner pipe member axially against the packing under pressure of the gland, and to provide an exterior flange upon the inner member in position to afford abutting faces for the spring on one side of the flange and the packing on the other side thereof. But while the presence of the spring acting in a direction to extrude the inner pipe member upon removal of the gland has presented a condition which would render the safety interlock of special importance as well as convenience, such a spring sustained joint, owing to the complication of the flange which prevented introduction from even the inner end of the dissected surrounding pipe member, have never heretofore been provided with such safety connection.

Another object of the present invention is to provide a safety interlock with a spring sustained joint of the kind described; and, accordingly, another feature of the invention consists in providing in a spring-sustained packed joint of the kind described, a rear spring abutment on the surrounding member and an enlargement on the inner end of the inner member which are integral with the members and constructed with screw threads which permit them to pass each other in assembly of the members; the screw threads thus becoming not only a means for working the interlocking shoulders past each other, but affording the additional advantage, if desired, of initially compressing the spring while the packing is being inserted and the gland screwed in place.

The preferred embodiment of the invention is shown in the accompanying drawing, in which—

Figure 1 is a side elevation, and Figure 2 a longitudinal section of the joint.

1 represents the coupling member or surrounding section of the pipe, and 2 the inner pipe section telescoping therewith. 3 represents the packing interposed between the pipe sections. 4 is the flange upon the inner pipe section; and 5 is the packing gland consisting of the follower $5^a$ and the threaded sleeve $5^b$ fitted upon the threads $5^c$ of the coupling section. Behind the flange 4 of the pipe section, in position to hold the latter tightly against the packing, is a spring 6 which has its abutment against the shoulder 7 of the surrounding section. The rear end of the pipe section 2 extends through the shoulder 7 and has a safety enlargement 8 in position to engage the face 9 of said shoulder in case the gland 5 should be released. The internal enlargement on the surrounding member which provides the shoulders 7 and 9 and the external enlargement 8 on the inner pipe member 2 are integral with the members that carry them, so that they are at all times necessarily present and cannot be forgotten or omitted in the assembly of the joint.

In order to facilitate assembly and disassembly of the members 1 and 2, the exterior annular face of the enlargement 8 and the interior annular face of the shoulder 7 are provided with registering threads so that it is simply necessary to rotate the members 1 and 2 relatively to pass the latter in or out with reference to the former. It is to be noted that the described method of assembling the safety interlock permits the surrounding member to be in a single integral structure and does not require its dissection or the separability of its enlargement or of that on the inner member; moreover, the method of passing the enlargements leaves their effectiveness as an interlocking means wholly intact, and the parts can if desired be so proportioned as to initially compress the spring 6 by merely screwing the threads past each other, and thereby greatly facilitate packing of the joint.

I claim:

1. A packed telescoping and revolving pipe joint, comprising an inner pipe member and a surrounding pipe member; said pipe members being provided with axially interlocking integral enlargements constructed with intermeshing screw threads upon their opposed circumferential faces and adapted to be screwed one past the other in the assembly of the joint and constitute abutting shoulders which resist axial disassembly of the members.

2. A packed telescoping and rotating pipe joint, comprising an inner pipe member having an external flange, a surrounding pipe member having a spring abutment opposed to said flange and a packing sustained by said flange, a spring interposed between said abutment and flange and tending to extrude the inner pipe member from the surrounding pipe member, and an integral enlargement on the end of the inner pipe member inwardly beyond said spring abutment; said spring abutment and enlargement being constructed upon their opposed cylindrical faces with intermeshing screw threads which permit them to be screwed past each other in the assembly and disassembly of the joint.

Signed at Chicago, Illinois, this 3rd day of March, 1921.

ERNEST J. MALONE.